United States Patent [19]
Maroschak

[11] 3,899,198
[45] Aug. 12, 1975

[54] COUPLING FOR INTERCONNECTING CORRUGATED PLASTIC TUBES
[76] Inventor: Ernest J. Maroschak, P.O. Box 878, Roseboro, N.C. 28382
[22] Filed: Apr. 18, 1973
[21] Appl. No.: 352,245

[52] U.S. Cl. ................. 285/27; 285/156; 285/179; 285/235; 285/260; 285/DIG. 4; 285/DIG. 22
[51] Int. Cl.² ......................................... F16L 47/00
[58] Field of Search ........ 285/235, DIG. 4, DIG. 22, 285/260, 423, 332, 156, 179, 27; 61/16

[56] References Cited
UNITED STATES PATENTS

| | | | |
|---|---|---|---|
| 3,239,254 | 3/1966 | Campbell | 285/DIG. 4 |
| 3,368,830 | 2/1968 | French | 285/423 X |
| 3,389,923 | 6/1968 | Love et al. | 285/423 X |
| 3,682,502 | 8/1972 | Corriston | 285/423 X |
| 3,695,643 | 10/1972 | Schmunk | 285/423 X |
| 3,727,953 | 4/1973 | Martin et al. | 285/DIG. 4 X |
| 3,785,682 | 1/1974 | Schaller | 285/423 X |

FOREIGN PATENTS OR APPLICATIONS
928,911   6/1963   United Kingdom................. 285/423

Primary Examiner—Thomas F. Callaghan
Attorney, Agent, or Firm—Parrott, Bell, Seltzer, Park & Gibson

[57] ABSTRACT

An improved coupling for interconnecting corrugated plastic tubes comprises a tubular plastic body having annular sleeve portions for receiving the ends of corrugated plastic tubes therein, a plurality of rigid, hollow, substantially hemispherical latching projections spaced around the sleeve portions and extending inwardly therefrom for engaging the corrugated plastic tubes in the sleeve portions and effecting a connection between the coupling and the tubes, and stop means extending inwardly from the tubular body for limiting the extent to which the corrugated plastic tubes may be received in the coupling.

1 Claim, 10 Drawing Figures

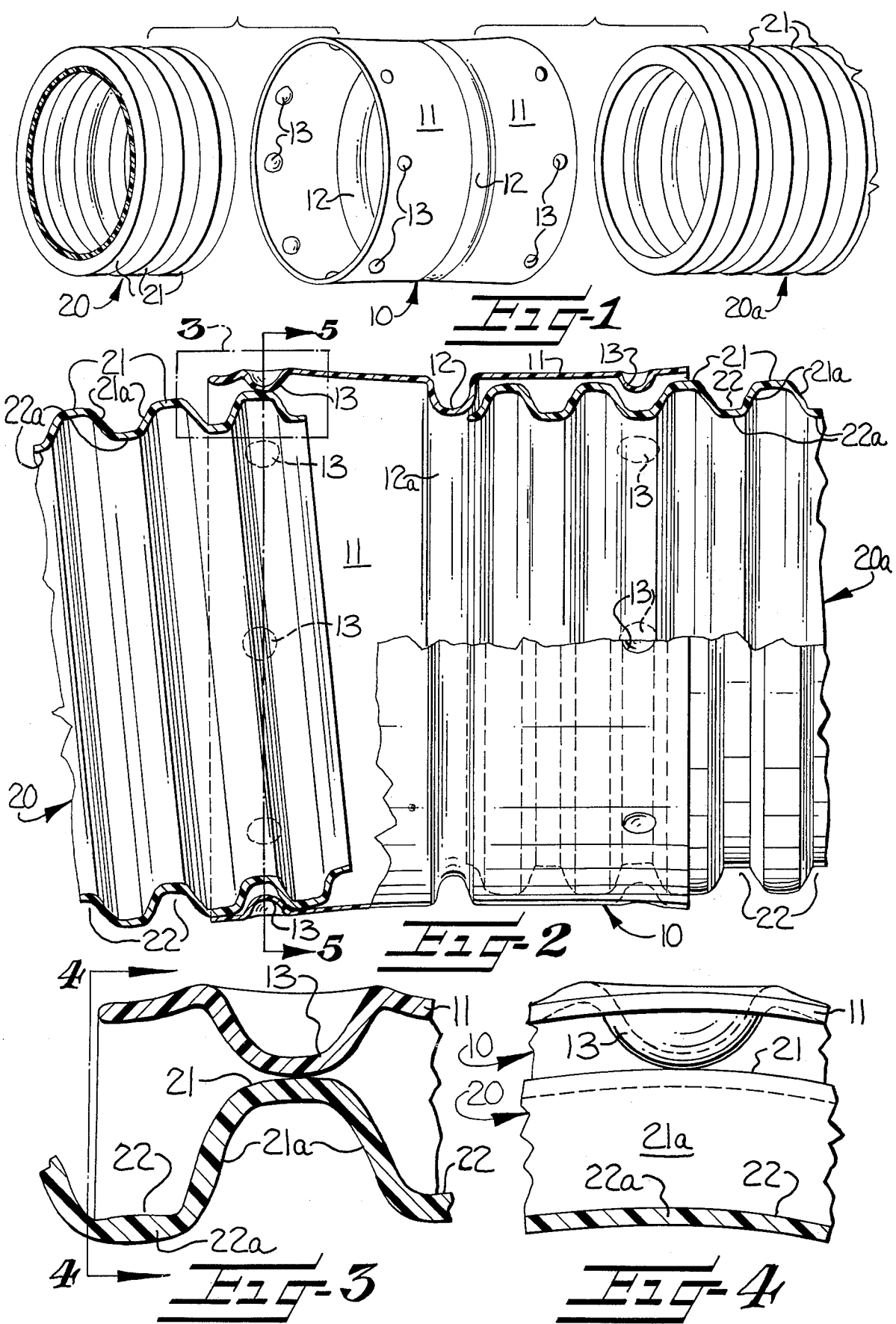

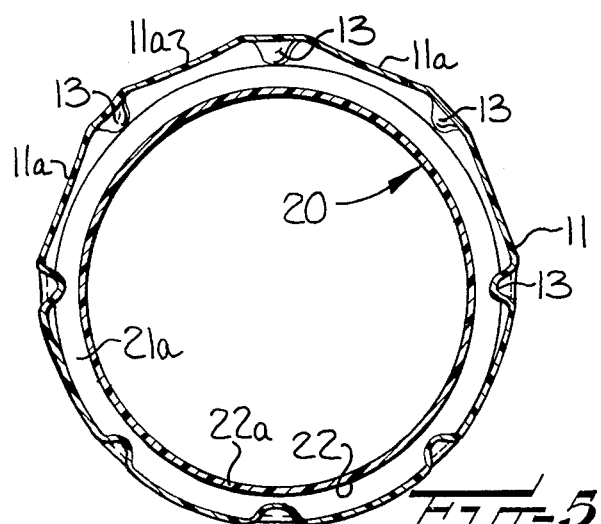
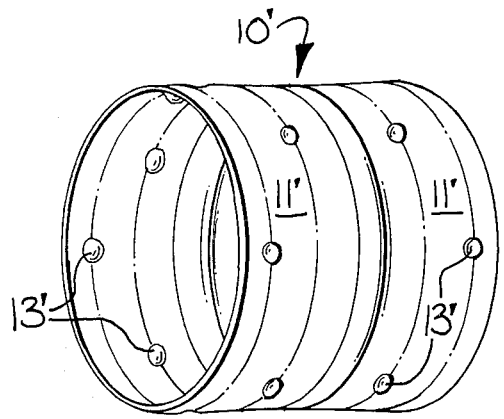
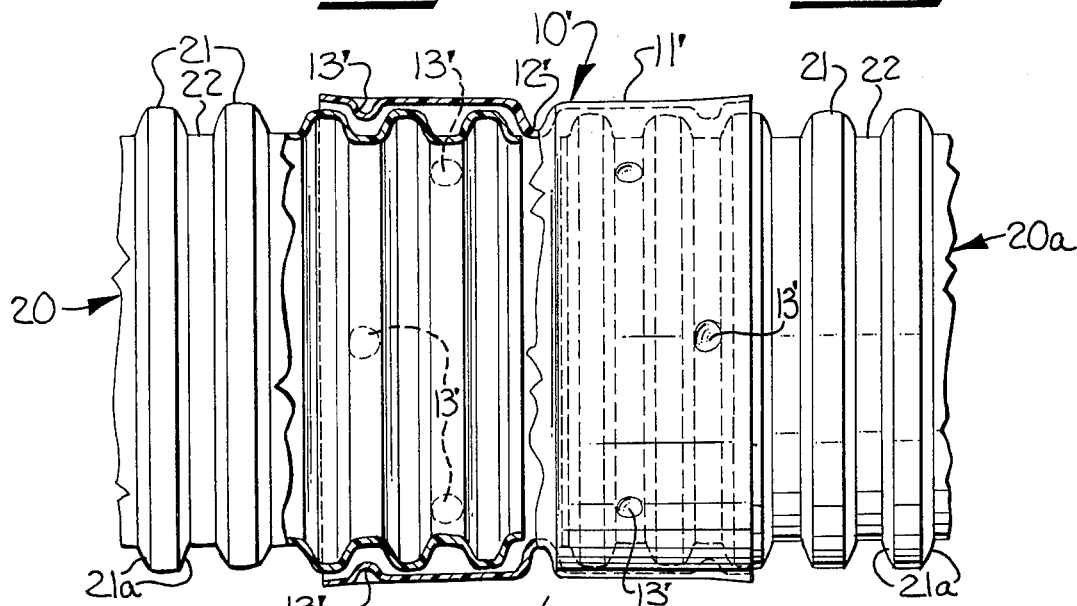
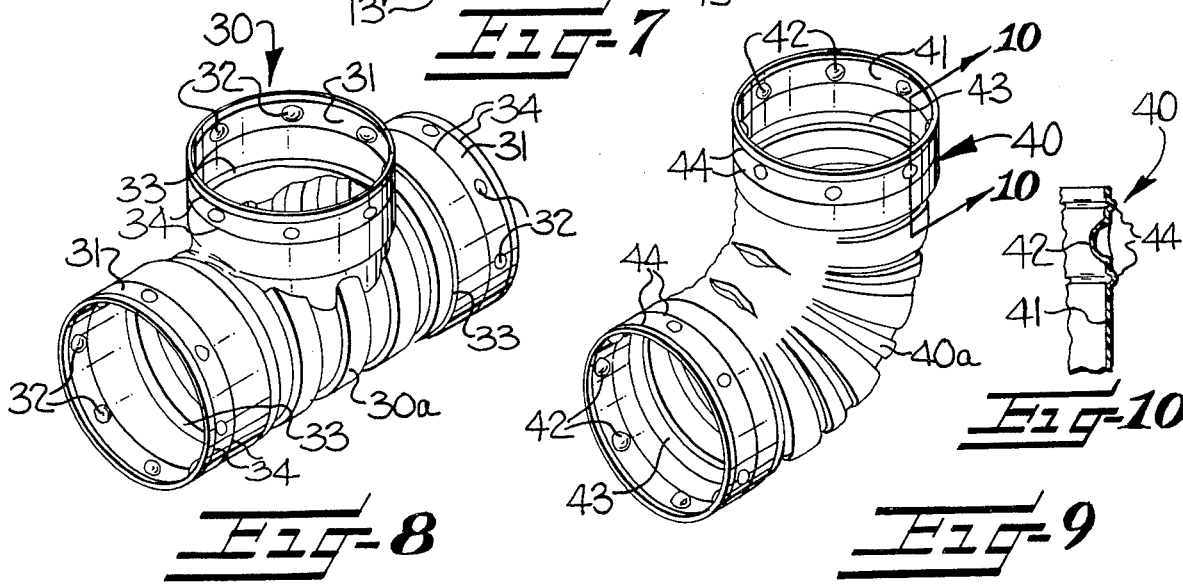

COUPLING FOR INTERCONNECTING CORRUGATED PLASTIC TUBES

The present invention relates to improved couplings for interconnecting corrugated plastic tubes of the type used in drainage and irrigation systems.

Heretofore, the couplings used for interconnecting corrugated plastic tubes have included relatively large, deformable, wedge-shaped projections for mechanically engaging the tubes in the couplings. Usually, the couplings employ only three or four projections for engaging each tube therein. Each of the wedge-shaped projections have an angularly related camming surface which is deformable to permit inserting the tubes in the couplings and an opposing vertical oriented locking surface to engage the tubes for retaining the same in the couplings. The relatively large size of these projections and the asymmetrical shape thereof allows the camming surfaces of the wedge-shaped projections to be deformed or collapsed by the force of a tube being inserted into the coupling, thereby permitting the tube to be inserted into the coupling past the restricted opening provided by the latching projections. Because of the deformable or collapsible nature of the wedge-shaped latching projections, the portions of the couplings surrounding the tube are displaced to a relatively small degree during insertion of a tube in the coupling.

In the present invention relatively small latching projections of a substantially hemispherical shape are provided in the coupling instead of wedge-shaped projections. The size and shape of these projections renders them rigid so as to outwardly displace the surrounding portions of the coupling to permit a tube to be inserted therein rather than to deform or collapse when a tube is inserted. By preventing deformation of the latching projections and thereby causing outward displacement of surrounding portions of the coupling, the resilient nature of the coupling is more effectively employed to obtain a secure connection between the coupling and the tube. Additionally, the relatively small size of these projections permits a greater number of the projections to be employed on a coupling for more effectively engaging the tubes in the coupling.

With the foregoing in mind, it is an object of this invention to provide an improved connection between a corrugated plastic tube and a coupling which may be easily effected and which will not become accidentally disconnected, wherein the connection is formed by relatively rigid, substantially hemispherical latching projections extending inwardly from the coupling.

It is another object of the present invention to provide a connection between a corrugated platic tube and a coupling using substantially hemispherical latching projections on the coupling which contact the tube only in point-to-point contact and which are rigid so as to effect displacement of the surrounding sleeve portion of the coupling when a tube is inserted therein for facilitating effecting the connection therebetween and to avoid deforming the latching projections.

Some of the objects and advantages of the invention having been stated, others will appear as the description proceeds, when taken in connection with the accompanying drawings, in which:

FIG. 1 is a perspective view of a coupling according to the present invention;

FIG. 2 is a partial sectional view of a coupling according to the present invention showing corrugated plastic tubes inserted therein;

FIG. 3 is a detailed view of that portion of FIG. 2 within the dashed lines;

FIG. 4 is a vertical sectional view taken along the line 4—4 of FIG. 3;

FIG. 5 is a vertical sectional view taken along the line 5—5 of FIG. 2;

FIG. 6 is a perspective view of a modified form of a coupling in accordance with the present invention;

FIG. 7 is a partial sectional view of the coupling of FIG. 6 showing corrugated plastic tubes connected thereto;

FIG. 8 is a perspective view of a tee coupling according to the present invention;

FIG. 9 is a perspective view of an elbow coupling according to the present invention; and FIG. 10 is a vertical sectional view taken along the line 10—10 of FIG. 9.

The coupling 10 illustrated in FIG. 1, is adapted for interconnecting two corrugated plastic tubes 20, 20a end-to-end in substantial axial alignment. Coupling 10 is suitably formed, as for example by conventional extrusion and blow molding techniques, from a resilient synthetic thermoplastic material such as polyethylene, polypropylene or polyvinyl chloride. The coupling 10 comprises an open-ended tubular body having generally smooth annular sleeve portions 11 at each end thereof, an annular rib 12 extending inwardly from the tubular body adjacent the sleeve portions 11 and providing abutment shoulders defining the innermost ends of the sleeve portions and serving as stop means to limit the extent to which the ends of corrugated plastic tubes may be inserted into the coupling, and a plurality of latching projections 13 spaced around the inner circumference of each sleeve portion 11 and extending inwardly therefrom and adapted for engaging the corrugated plastic tube and effecting a connection between the tube and the coupling.

Tubes 20, 20a have a nominal diameter of from about 4 inches to about 6 inches and are formed of suitable plastic material and include successive spaced apart annular ribs 21 with intervening annular valley portions 22 between successive ribs and defining annular corrugations along the periphery of the tubes with the number of ribs and valley portions per linear foot being about seventeen in number. The ribs 21 are provided with side wall portions 21a which connect with the floor or bottom 22a of the valley portions. The tubes may be unperforated, as illustrated, or may include perforations in the form of round drainage holes or arcuate slits. As is well known, it is customary to provide round drainage holes in corrugated plastic tubes used in septic tank fields or other drainage systems, and to provide circularly arranged series of arcuate slits, usually in alternate valleys, in corrugated tubes used for underground irrigation systems.

Referring now more particularly to coupling 10, as seen most clearly from FIG. 2 the sleeve portions 11 thereof are adapted for receiving the ends of corrugated plastic tubes therein, with the sleeve portions preferably being of a length sufficient to accommodate at least two annular ribs and two annular valleys of the tube and with the inside diameter of the sleeve portions being slightly greater than the outside diameter of the ribs on the tube. Although not readily noticable from viewing FIG. 2, each sleeve portion is tapered slightly outwardly over its entire length in order to facilitate inserting the corrugated plastic tube therein. Preferably, the inside diameter of each sleeve portion at the outermost end is about 0.001 inch greater than the inside diameter of the sleeve portion at the innermost end thereof adjacent rib 12. As illustrated in FIG. 2, the opposite side walls 12a of rib 12 provide abutment shoulders which serve as stop means for both sleeves of the coupling.

The latching projections 13 of the coupling are integrally formed on sleeve portions 11 and extend radially inwardly therefrom a sufficient distance to define an effective diameter intermediate the outside diameter of the ribs 21 and that of the floor or bottom 22a of the valley portions. Thus, when a tube is received in sleeve portion 11, as illustrated in the right hand portion of FIG. 2, an interference fit is provided between the latching projections 13 and the ribs 21 of the tube for effecting a connection between the tube and the coupling. As illustrated the latching projections 13 are circularly arranged in a single row around the inner circumference of the sleeve portions 11 and extend into a common valley portion 22 of tube 20. The row of projections is spaced axially inwardly a short distance from the outer end of the sleeve portion so that when the tube is fully received in the sleeve portion, the latching projections extend into the second valley portion from the end of the tube and an additional valley portion is provided behind the row of projections to aid in preventing accidental disconnection of the tube from the coupling.

In order to provide a connection between the tube and the coupling which will effectively retain the tube in the coupling and prevent accidental disconnection therefrom while permitting the connection to be easily made using only hand pressure, the latching projections are formed of a particular form and size. More specifically, the latching projections are of relatively small diameter and essentially rigid as compared to the surrounding sleeve portion for aiding in connection and removing the tube from the coupling while also being of sufficient height to effectively engage the tube in the coupling.

As seen in FIGS. 2 and 3, latching projections 13 are of hollow construction and substantially hemispherical or dome-like in shape which serves to impart rigidity thereto. The term substantially hemispherical, as used herein, is intended to encompass a shape which may be slightly greater than or slightly less than exactly one-half a sphere. As also seen in FIG. 2 and 3 the projections have a wall thickness which is substantially uniform throughout and of about the same thickness as the surrounding adjacent sleeve portion, preferably no greater than about 0.060 inch. Additionally, the wall thickness of the projections is desirably less than about one-half the height or inward extent of the projections.

The projections are of relatively small size, preferably no more than about ¼ inch in diameter as measured across the base interiorly of the sleeve portion. This small size also aids in imparting rigidity to the projections while providing sufficient height or inward extent to the projections to obtain effective latching engagement. In obtaining the desired connection between the coupling and the tube, it has been found that the projections should have a diameter which is equal to about one-half the distance between corresponding points on adjacent ribs of the tube and have a height or inward extent from the surrounding sleeve portion which is equal to about one-half the depth of valley portions 22 between adjacent ribs. This relationship is obtained when the projections are formed of the aforementioned diameter of no more than about ¼ inch.

The most suitable connection is provided when at least four latching projections are employed on each sleeve portion. However, the relatively small size of the projections permits a greater number to be used, if desired, for more securely engaging the tube. Preferably, and as illustrated, eight latching projections are employed around each sleeve portion and they are arranged in diametrically opposed pairs.

As previously noted, the latching projections 13 are so constructed as to be rigid. The relative rigidity of the latching projections 13 with respect to the surrounding sleeve portion is important in providing a connection which may be quickly obtained by hand, yet which will be secure against accidental disconnection. The latching projection must be rigid so that it will not deform under the forces of inserting a pipe in the coupling. As shown in the left hand portion of FIG. 2 and in FIG. 3, when inserting a tube in the coupling, the rib of the tube bears against the latching projection at a single point of contact rather than over a line of intersection or over a wide surface of contact. Due to the rigidity of the latching projection, the forces exerted against the latching projection by the rib in this point-to-point contact are transmitted to the surrounding adjacent sleeve portions with the result that the surrounding adjacent sleeve portion is displaced outwardly as seen in FIGS. 3 and 4 to permit the rib to pass beneath the latching projection. Thus, as seen in FIG. 5 where tube 20 is shown partially inserted into sleeve portion 11, sections 11a thereof lying between successive latching projections 13 are displaced outwardly and are straightened from their normally arcuate configuration. When the tube is fully inserted, the resilient nature of the thermoplastic material forming the coupling returns the sleeve portion to its normal configuration whereby the latching projections extend into a valley portion and engage the tube in the coupling. The rigidity of the latching projections also prevents deformation of the lowermost illustrated latching projection in FIG. 2 so that it may effectively serve as a fulcrum or pivot point during insertion of the tube in the sleeve portion.

The manner in which a connection between the pipe and the coupling is made is shown in the left hand portion of FIG. 2. As illustrated, tube 20 has been partially inserted into the mouth of the left hand sleeve portion in FIG. 2 with the lowermost illustrated latching projection 13 extending into the valley portion 22 at the bottom of the tube and with the uppermost illustrated latching projection bearing in point-to-point contact against the first rib 21 at the end of tube 20. The remaining latching projections engage the tube in point-to-point contact at various locations between the first rib 21 and the first valley portion 22. It has been found that a connection is most easily obtained when the tube is inserted stepwise with the tube being initially cocked at an angle, as shown, and subsequently being straightened so that all of the latching projections extend into the first valley portion of the tube. To insert the tube the remaining distance into the sleeve portion, it is again cocked at an angle to the axis of the sleeve portion to move the second rib of the tube past the row of latching projections and into the second valley portion from the end of the tube. The tube is then again straightened with respect to the axis of the sleeve portion to position all of the latching projections in the second valley portion of the tube. While a relatively secure connection may be provided with the latching projections extending into the first valley portion, it is generally preferred that the tube be fully inserted into the sleeve portion so that the latching projections extend inwardly into the second valley portion as shown in the right hand portion of FIG. 2.

A modified form of the invention is shown in FIGS. 6 and 7 and is quite similar to the first form of the invention shown in FIGS. 1–5. Accordingly, those parts shown in FIGS. 6–7 which correspond to similar parts in FIGS. 1–5 will bear the same reference characters, with prime notation added where applicable, to avoid repetitive description. Essentially, coupling 10' according to the modified form of the invention differs from the coupling of the first form in that the latching projections 13' are circularly arranged in two axially spaced rows around sleeve portion 11' instead of being circularly arranged in a single row. This arrangement permits the latching projections to extend into two successive valley portions on the end of the pipe for effecting a secure connection between the pipe and the coupling. As shown, four latching projections are provided in each row although a different number of projections may be employed, and these projections are arranged in diametrically opposed pairs.

FIG. 8 shows another coupling according to the present invention. Tee coupling 30 has a tubular plastic body with three sleeve portions 31, each having latching projections 32 thereon of the form and arrangement previously described with reference to FIGS. 1–5. An inwardly extending rib 33 is provided adjacent the innermost end of each sleeve portion to provide an abutment shoulder which serves as stop means for limiting the extent to which a corrugated plastic tube may be inserted into the tee coupling. The medial body portion 30a of the coupling between the sleeve portions 31 is preferably corrugated, as illustrated, for increased compressive strength of the coupling. Since the sleeve portions 31 and the latching projections 32 of this embodiment are essentially the same as those previously described with reference to FIGS. 1–5, a further more detailed description of these sleeve portions is deemed unnecessary.

FIG. 9 shows another coupling according to the present invention, wherein the coupling is in the form of an elbow. The elbow coupling 40 includes sleeve portions 41 at opposite ends thereof with a corrugated medial body portion 40a interconnecting the sleeve portions 41. As in the previous embodiments, an inwardly extending rib 43 is provided adjacent the innermost end of each sleeve portion providing an abutment shoulder to serve as stop means for limiting the extent to which a tube may be inserted into the coupling. Again, the sleeve portions 41 and the latching projections 42 thereon are essentially the same as those employed on the coupling described with reference to FIGS. 1–5. Accordingly, a more detailed description of this coupling is deemed unnecessary.

An additional modification to the couplings of the present invention is shown on the tee and elbow couplings of FIGS. 8 and 9 and comprises a pair of annular ridges indicated by the reference character 34 in FIG. 8 and 44 in FIG. 9. As shown most clearly in FIG. 10, the annular ridges 44 are located on the sleeve portion 41 closely adjacent the latching projections 42 and on opposite sides thereof. They are relatively small in size, having a height no greater than about the wall thickness of the sleeve portion 41, and are formed integrally with the sleeve portion to provide a corresponding groove or recess on the interior surface of the sleeve portion 41. The annular ridges may be provided on the sleeve portions of the couplings to provide additional stability thereto and to assist in maintaining the mouth of the coupling undeformed and fully open for easily receiving the end of a tube therein. Additionally, the ridges are helpful during the manufacture of the couplings, as they provide a guide for cutting the couplings apart after molding.

In the drawings and specification there have been set forth preferred embodiments of the invention, and although specific terms are employed, they are used in a generic and descriptive sense only and not for purposes of limitation.

That which is claimed is:

1. A plastic tube having spaced apart successive annular ribs with annular valley portions therebetween extending along the length thereof and defining annular corrugations on the periphery of the tube and a plastic coupling connected to an end of said plastic tube and in fluid communication therewith, said coupling comprising a generally tubular plastic body including an annular sleeve portion receiving an end of said plastic tube therein, said sleeve portion being tapered outwardly over its entire length to facilitate insertion of said tube therein with the diameter of the sleeve at the outermost end being about 0.001 inch greater than the diameter at the innermost end, said sleeve portion having integrally formed therewith a series of eight spaced apart latching projections circularly arranged in opposing pairs in a single row around the inner circumference of said sleeve portion and extending inwardly into a common valley portion on said tube for engaging the tube and effecting the connection between the coupling and the tube, said latching projections being of hollow construction and substantially hemispherical in shape and having a diameter of no more than about ¼ inch as measured across the base interiorly of the sleeve portion and equal to about one-half the distance between corresponding points on successive ribs of said tube and extending inwardly from said sleeve portion for a distance equal to about one-half the depth of the valley portions between adjacent ribs on said tube, said hollow latching projections also having a wall thickness of less than about one-half of said inwardly projecting distance and being rigid so as to effect displacement of the surrounding adjacent sleeve portion when the tube is inserted in said sleeve portion for facilitating effecting the connection therebetween and to avoid deforming the latching projections, relatively small annular ridges formed integrally with said sleeve portion and located closely adjacent to and on opposite sides of said circularly arranged latching projections, said annular ridges serving to provide additional stability to said sleeve portion and to assist in maintaining the sleeve fully opened for readily receiving the end of said plastic tube therein, and inwardly extending stop means adjacent the innermost end of said sleeve portion for limiting the extent to which the plastic tube may be received in said coupling.

* * * * *